July 17, 1962   R. C. ATWOOD   3,045,105
STUD GUN ADAPTER

Filed July 14, 1961   3 Sheets-Sheet 1

INVENTOR.
REGINALD C. ATWOOD
BY

ATTORNEY

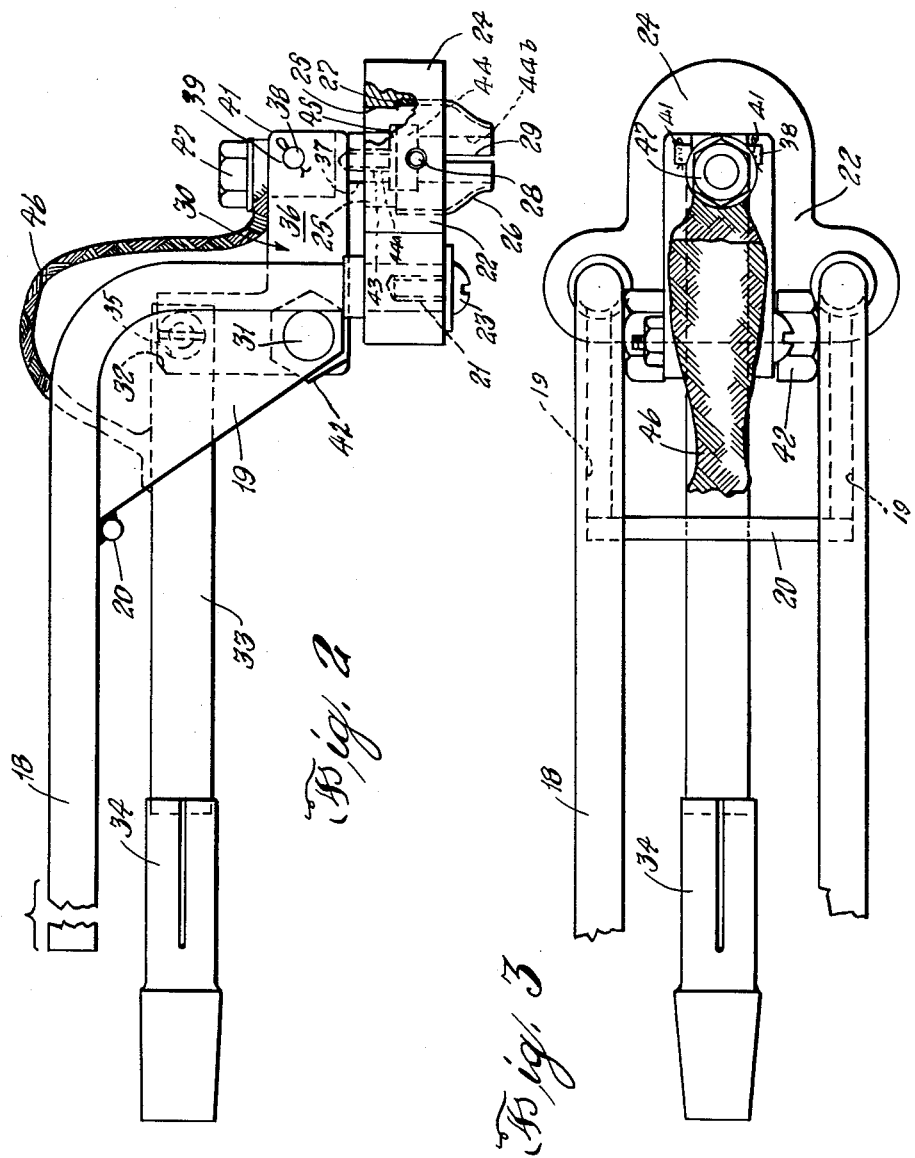

July 17, 1962  R. C. ATWOOD  3,045,105
STUD GUN ADAPTER

Filed July 14, 1961  3 Sheets-Sheet 3

INVENTOR.
REGINALD C. ATWOOD
BY
Max A. Farmer
ATTORNEY

United States Patent Office 3,045,105
Patented July 17, 1962

3,045,105
STUD GUN ADAPTER
Reginald C. Atwood, Pond Road, South Berwick, Maine
Filed July 14, 1961, Ser. No. 124,235
13 Claims. (Cl. 219—98)
(Granted under Title 35, U.S. Code (1952), sec. 266)

The invention described herein may be manufactured and used by or for the Government of the United States of America for governmental purposes without the payment of any royalties thereon or therefor.

This invention relates to stud gun welding devices, and particularly to those useful in electrically welding studs to a face of an object to which access for the welding operation is difficult or impossible.

Guns for holding a stud while welding it endwise to a plate or face of an object are widely used, but where a stud is to be welded to a plate or face of an object where there is limited space preventing the use of the typical gun in the welding operation, the practice has been to hand weld such studs in the desired positions. This problem arises frequently in ship building, for example, where studs must be welded to a ship plate where often the space is very shallow and in which a conventional stud gun cannot be inserted for holding the stud while it is welded to a plate. Hand welding in such cases is time consuming and can cause considerable damage by inadvertent arc strikes on piping and cables in confined or limited spaces or areas.

An object of this invention is to provide a stud welding gun which can be used to automatically and electrically weld metal studs to a face of an object in limited spaces and areas where the conventional stud welding guns heretofore available could not be used, which makes unnecessary any time consuming hand welding and the danger of damage from inadvertent arc strikes, and which is relatively simple, compact, practical, convenient, durable, light in weight, and inexpensive in construction.

Another object is to provide an attachment which can replace functionally equivalent parts of a conventional stud welding gun and convert it for use in the automatic, electric welding of studs to an object in confined or limited spaces or areas in which the conventional stud welding gun cannot be used successfully, and which will accomplish the objects recited in the preceding paragraph.

Other objects and advantages will be apparent from the following description of two examples of the invention, and the novel features will be particularly pointed out in connection with the appended claims.

In the accompanying drawings:

FIG. 2 is a side elevation of an adaptor or attachment for use with the gun of FIG. 1 in accordance with this invention;

FIG. 3 is a plan of the attachment or adaptor of FIG. 2;

Figure 1:
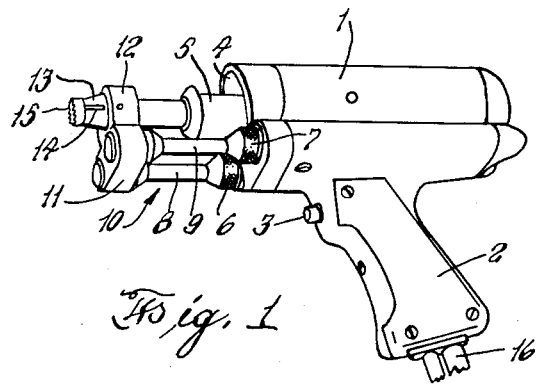
FIG. 1 is a perspective of a conventional stud welding gun heretofore used widely in the automatic, electric welding of studs to an object, and which may be converted or modified for use in accordance with this invention.
Figure 4:
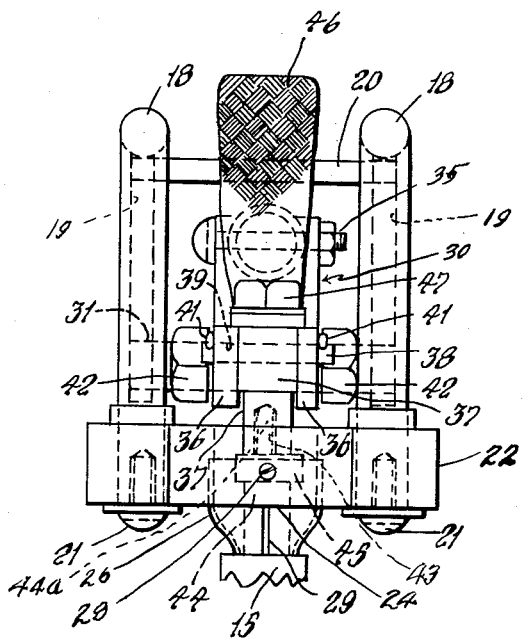
FIG. 4 is an end elevation of the same.
Figure 5:
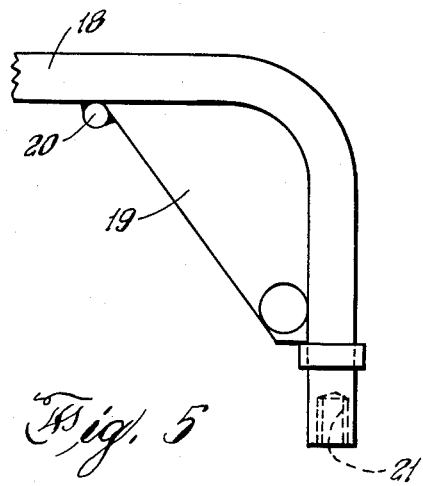
FIG. 5 is a side elevation of the frame of the attachment.
Figure 6:
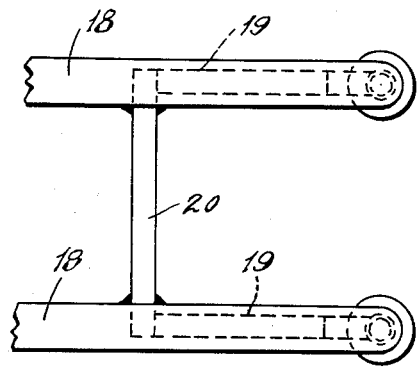
FIG. 6 is a plan of the same.
Figure 7:
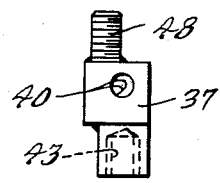
FIGS. 7 and 8 are side views of a chuck holder which is a part of the illustrated adaptor or attachment.
Figure 8:
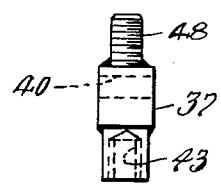
Figure 8A:
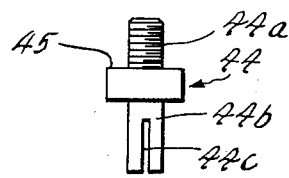
FIG. 8a is an elevation of a suitable stud holder.

In the embodiment of the invention illustrated in FIGS. 1 to 8a, and referring first to FIG. 1, the stud welding gun illustrated is a conventional, portable gun for welding metal studs endwise against a plate or surface of an object. It has a casing 1 with a handle 2, together somewhat resembling the shape of a gun. Such guns per se are not the subject of this invention, but only their combination with a particular attachment or adaptor. Hence the mechanisms within these guns are not described or illustrated. The handle 2 has a control trigger 3 which controls the welding activity. One end of the casing 1 has an opening 4 through which extends outwardly an actuating rod 5. On the same end of the casing 1, are two chucks 6 and 7 which receive and detachably hold the legs 8 and 9 of a frame 10. This frame at its free end carries a foot 11 joining the ends of legs 8 and 9 and having a lug or ear 12 extending sidewise therefrom. This lug or ear 12 has a passage from face to face therethrough, in the end of which passage, remote from the casing 1, a ferrule holder 13 is detachably secured, so as to extend beyond the foot. This extending end of the holder 13 has a plurality of slits 14 from the free end and a ceramic ferrule 15 is detachably confined in the free end of this holder by slightly springing apart the slitted end of the holder enough to receive a reduced shoulder on an end of the ferrule. Within the casing is timing mechanism which, when the trigger 3 is pressed inwardly, automatically controls the welding operation by first withdrawing slightly a stud held by the actuating rod and having its free end projecting slightly outwardly beyond the outer end face of the ferrule 15. The stud to be welded is detachably attached to the rod 5 with its free end extending along the passage in the foot and slightly through the ferrule 15.

To perform a welding operation, a stud is attached to the free end of rod 5, one wire of the welding circuit connected temporarily to the object or plate to which the stud is to be welded and the other side of the circuit connected by cable 16 to the handle 2. The operator presses the metal stud, held in the gun, against the object and then presses the trigger 3. The usual mechanism within the casing and handle then begins its automatic cycle in which the stud is automatically retracted or pulled away from the plate or object and into the ferrule to create an electric arc between the free end of the stud and the object. The ferrule is held in this position during the arcing period for which the timing mechanism with the gun is pre-set. A portion of the free end of the stud and the plate or object are melted by the arc. At the completion of the arcing period, a main spring in the gun is released, plunging the stud into the molten pool on the plate within the ferrule to complete the weld. The congealing of the molten pool unites the stud firmly to the plate or object, and the gun is then withdrawn leaving the stud attached to the plate. This is the conventional mechanism and procedure for stud welding, and is illustrated and described, for example, in Operation and Maintenance Manual #6 published by Nelson Stud Welding, Division of Gregory Industries, Inc. of Lorain, Ohio, as revised in April 1958.

It is useful only in instances where there is ample access to press the stud and gun against the plate in a direction normal to the plate. Where such access is limited or restricted so that one cannot press the gun against the plate at right angles to the latter, resort heretofore has been to manual welding of studs in such spaces. The present invention relates to a modification of such a gun to adapt it for use in welding studs to plates in such limited or restricted areas or spaces. This modification is in the nature of a substitution of a modified frame for the frame 10 and an attachment to the free end of the present actuating rod 5 and is illustrated, for example, in FIGS. 2 to 8a.

Referring next to FIGS. 2 to 8a, an attachment or adaptor is illustrated for use with the conventional gun shown in FIG. 1. It employs a frame 17 having rod-like legs 18, which legs are attached to the gun in place of the frame 10 of FIG. 1, with the legs 18 detachably received and held in chucks 6 and 7, in place of the legs 8 and 9 of FIG. 1. The legs 18, at their end portions remote from the gun, are bent at right angles, to the ends of the legs attached to the gun both in the same direction, and the legs along the bends are reinforced by generally triangular plates 19 that are welded to the legs. A rod 20 extends between and is welded at its ends to the straight portions of the legs 18 near the margin edges of the plates 19 to maintain the desired spacing between the legs. The free end faces of the legs 18 have threaded recesses 21 (see FIGS. 2 and 5) and a foot 22, similar to foot 11 of FIG. 1, abuts against these recessed end faces. Screws 23 pass through the foot and are threaded into the recesses 21 so as to confine the foot to the free angle end of the frame.

The foot 22 has a lug or ear 24 beyond the part attached to the frame and corresponding to the lug or ear 12 of FIG. 1, and this lug 24 has a passage 25 (FIGS. 2 and 4) from face to face thereto. A ferrule grip 26, similar to the grip 13 of FIG. 1 is secured in the passage 25 against a shoulder 27 therein, by a set screw 28 which is threaded in the lug, extends into passage 25, and there contacts the ferrule grip. This grip extends out of the passage 25 in the direction in which the adjacent bent end of the frame extends, and its free outer end is provided with slits 29 that extend from the outer free end for a substantial distance along it in a direction lengthwise of the grip. This provides spring ends of the grip and they may be wedged slightly apart when the reduced cylindrical end of a ceramic ferrule 15 is forced into the free end of the grip, as is done in FIG. 1.

Two bell crank levers 30 are pivoted on a cross pin 31 that extends between and is fixed to the frame plates 19 near the foot 24. An arm 32 of each lever 30 is pivoted to a side of one end of a rod 33, and the latter extends along the legs 18 of the frame and is attached to a chuck 34 that is detachably confined on the free end of the actuating rod 5 of the gun (see FIG. 1). The levers 30 are disposed at opposite sides of rod 33, and a bolt 35 passes through the arms 32 of levers 30 and the free end of rod 33, to pivotally confine the levers 30 to the end of rod 33. The rod 33 spaces the levers 30 apart. The other arms 36 of levers 30 extend across that face of the lug 24 of foot 22 which is opposite from ferrule grip 26.

A chuck holder 37 (see FIGS. 3, 4, 7 and 8) is disposed between and spaces apart the free ends of the lever arms 36 and a pivot pin or rod 38 passes through aligned passages 39 (FIGS. 2 and 4) in the free ends of lever arms 36 and a passage 40 (FIG. 7) through the chuck holder 37 to provide a pivotal connection between the free ends of arms 36 and the chuck holder. Cotter pins 41 pass through transverse passages in the ends of the pin or rod 38 and by engagement with the outer faces of the levers 30 prevent removal of the rod or pin 38 from the levers 30. Collars 42 (FIGS. 2-4) may be disposed on cross pin 31 between the levers 30 and the frame plates 19 to limit any tendency of levers 30 to move apart on the pin 31.

The chuck holder 37 depends, with substantial clearance, into the passage 25 and its lower or depending end face (FIGS. 2 and 4) has a threaded recess 43 (see FIGS. 2, 4, 7 and 8) into which is threaded one end 44a of a stud holder or chuck 44 (FIG. 8a) which serves as a detachable extension of the holder 37. The chuck 44 extends along passage 25 and its free end 44b is tubular. The wall surrounding the tubular end has a plurality of slits 44c from the free end, so as to provide spring fingers that can be sprung slightly apart to receive between them and detachably hold one end of a stud (not shown) which is to be welded to a plate. A flange 45 on the stud holder limits the threading of end 44a into the recess 43 of the chuck holder 37.

A stud (not shown) detachably carried by the chuck extends through the usual ceramic ferrule to just a small extent, so that it can, at the start of the welding operation, contact with the plate to which it is to be welded, but be withdrawn into the ceramic ferrule when it is retracted enough to strike an arc. A different stud chuck or holder must be used for each different diameter of stud to be welded. The foot 12 of FIG. 1 and foot 22 of FIGS. 2-8 may advantageously be made of plastic material. A flexible, braided, metallic strap, electrical conductor 46 is secured at one end to the actuating rod extension 33 and at its other end under the head of a nut 47 that is threaded upon an upstanding or projecting threaded stud 48 (FIGS. 7 and 8) on the chuck holder 37.

In the use of the attachment shown in FIGS. 2 to 8a, the legs 8 and 9 with foot 11 and the ferrule grip 13 are removed from the casing 1 of FIG. 1 and the legs 18 of the substitute frame are placed in the chucks 6 and 7 of the casing 1 and confined therein. The coupling piece 34 is attached to the free end of the actuating rod 5 of the gun shown in FIG. 1, and these changes provide a detachable coupling of the substitute frame and actuating rod extension to the mechanism in the casing 1. The ferrule grip is placed in the passage 25 and held therein by tightening set screw 28.

The gun of FIG. 1 so equipped with the substitute frame and the parts carried thereby, and the actuating rod extension is then ready for a welding operation. The gun so equipped is then manipulated to press the free end of the stud to be welded against the plate or face of the object ready for welding. Because of the longer frame that carries the stud, and the angular end, the stud can be placed in different positions for welding in places or areas of shallow depth, where the conventional welding gun cannot be used, and also used where the conventional gun can be used. Then the welder operates the trigger 3 of the gun which starts an automatic welding operation, during which a circuit is completed from the source of welding current to the plate or object and to the gun by conductor 16. The gun conducts the welding current to the actuating rod 5, and through its extension (parts 33 and 34) and flexible conductor 46 to the stud holder and stud.

The mechanism in the casing 1 then retracts the rod 5 slightly and this motion is transmitted through the rod extension to the bell crank lever to rock the latter, and because of the pivoted connection of the lever 30 to the chuck holder 37 and the stud holder the stud is retracted. This withdraws the stud slightly from the plate and strikes an arc. After an interval of time predetermined and for which the timing mechanism in the gun is set, the current in the circuit is broken and a spring in the gun is released to push the stud through the molten metal pool formed by the arc into contact with the plate, where it is held until the molten metal of the puddle congeals, whereupon the gun is removed from the stud. The ceramic ferrule, into which the stud is withdrawn at the start of the arc, contacts the plate and confines the metal of the puddle around the stud end as usual in stud welding.

It will be understood that various changes in the details, materials and arrangements of parts, which have been herein described and illustrated in order to explain the nature of the invention, may be made by those skilled in the art, within the principle and scope of the invention as expressed in the appended claims.

I claim:

1. An attachment for a stud welded gun of the type having a handle with an activating trigger, an actuating rod carried by and extending from said handle, and a detachable frame having a pair of legs detachably received in chucks in the handle and extending from the handle along the actuating rod, to enable one to weld studs to an object in places where access for the welding operation with the usual welding gun is difficult or impossible, which comprises a substitute frame having legs at one end formed to be received in and detachably held by said handle chucks, the other end of said frame having an angle end extending at approximately a right angle to its said legs at said one end, a foot secured to said angle end of said substitute frame and having a passage from face to face thereof in a direction crosswise of said substitute frame legs, a ferrule grip secured in said passage at the end furthest from said substitute frame legs and projecting therefrom in the direction in which said angle end extends from said substitute frame legs, a bell crank lever pivoted, at the junction between its arms, to said substitute frame near said foot, an actuating rod extension attachable to the free end of the actuating rod of said handle and pivoted at its free end to the arm of said bell crank lever which extends along the angle end of said substitute frame, a chuck holder secured to the free end of the other arm of said bell crank lever and depending toward said foot in a position approximately centrally of said passage in said foot, a flexible conductor attached to said extension and to said chuck holder, and a stud holder coupled to said chuck holder, extending into said ferrule for detachably holding a stud to be welded with its free end extending through and guided by a ferrule in said ferrule holder.

2. In a stud welding gun of the type having a handle with an activating trigger, an actuating rod extending from said handle, and chucks in said handle for detachably receiving frame rods that support a stud holder during a welding operation, that improvement to enable one to weld studs to an object in places where access for the welding operation with the usual frame and rod is difficult or impossible, which comprises a substitute frame having, at one end, a pair of legs to fit and be held in said chucks in place of the usual frame legs, and having its other, free end portion extending in a direction crosswise of the plane of said pair of legs, a foot secured to said free end of said substitute frame and having a passage from face to face therethrough in a direction parallel to said crosswise direction, a bell crank lever pivoted at the junction of its arms to said other free end portion of said substitute frame, with one arm of such lever extending along said other free end of said substitute frame and its other arm extending along and spaced from that face of said foot which is nearest the plane of said pair of legs which fit into said chucks, an extension for said actuating rod formed at one end for coupling to the free end of said actuating rod of said handle and at its other end pivoted to said one arm of said bell crank lever, a ferrule grip secured in said foot passage and extending outwardly from said foot at the face thereof opposite from said other arm of said bell crank lever, a chuck holder secured to the free end of said other arm of said bell crank lever in approximate alignment with the axis of said passage, a stud holding chuck secured in said chuck holder and extending loosely through said passage and into said ferrule holder and a flexible conductor attached at one end to said extension and at its other end to said chuck holder.

3. The device according to claim 2, wherein said stud chuck is detachably coupled to said chuck holder.

4. The device according to claim 2, wherein said foot is detachably confined against the free end face of said other end of said substitute frame.

5. A stud welding gun for welding studs to an object in places where access for the welding operation with the usual welding gun is difficult or impossible, which comprises a stud welding gun with a handle having a control trigger, frame holding chucks opening out of a face of the gun handle, and an actuating rod extending from said face of the gun handle adjacent said chucks and movable back and forth in the direction of its length, a frame having a pair of legs secured in said chucks and extending adjacent and approximately parallel to said rod, and terminating in an angle end which extends in a direction crosswise of the lengths of said legs, a foot secured to the free end portion of said angle end and having a passage therethrough from face to face in a direction approximately parallel to the length of said angle end, stud holding means disposed to support a stud to be welded in said passage in a position in which it extends beyond said passage in the same direction in which said angle end extends, means mounting said stud holding means for movement to carry said stud back and forth in a direction lengthwise of the passage, and means coupling said actuating rod to said stud holding means for causing said movement of the latter upon actuation of said rod, and current carrying means connecting said rod to said stud holding means.

6. A stud welding gun for welding metal studs to an object in places where access to the object for the welding operation with the usual welding gun is difficult or impossible, which comprises a gun with a handle carrying a control trigger, and an actuating rod projecting from the handle, a frame carried by said handle and extending therefrom in the same direction as said actuating rod and terminating at its free end in a free end portion making a right angle to the end portion which projects from said handle, means carried by said free end portion of said frame for supporting a stud to be welded in welding position for limited movement in a direction at right angles to the length of said rod, means carried by said frame and connected to said actuating rod and to said stud supporting means for causing such limited movement of the stud supporting means upon endwise movements of said rod, and a flexible conductor connected at one end to said rod and at its other end to said stud supporting means.

7. A stud welding device for welding metal studs to an object in places where access to the object for the welding operation with the usual stud welding gun is difficult or impossible, which comprises a stud welding gun with a handle carrying a control trigger, an endwise reciprocatory actuating rod, and means for reciprocating said rod into the control of said trigger, a frame carried by said handle and extending from the handle in the same direction as, and in proximity to, said rod, motion converting means carried by the free end of said frame and coupled to the free end of said rod for converting endwise movements of said rod into back and forth movements in directions at right angles thereto at the free end of said frame, and stud mounting means on the free end of said frame and operable by said motion converting means in limited back and forth movements at right angles to the directions of movements of said rod, and a flexible conductor electrically connecting said rod to said stud mounting means, whereby a stud carried by said stud mounting means may be pressed endwise against said object, an arc struck and later terminated between the stud and said object by endwise movement of the stud produced by endwise movement of said rod under the mechanism of the gun within the handle.

8. The device according to claim 7, and a ferrule support on said free end of said frame through which extends any stud carried by said stud mounting means for contact with said object when said handle is manipulated to press the free end of such stud against said object for welding thereto.

9. A stud welding device for welding metal studs to an object in places where access to the object for the welding operation with the usual stud welding gun is difficult or impossible, which comprises a stud welding gun with a handle carrying a control trigger, an endwise reciprocatory actuating rod, and means for reciprocating said rod into the control of said trigger, a frame carried by said handle and extending from the handle in the same direction as, and in proximity to, said rod, a bell crank lever pivoted on said frame adjacent the free end of the frame, with one arm pivotally connected to the free end of said rod, and its other arm extending in a direction approximately parallel to the length of said rod, stud supporting means, formed to detachably hold one end of a stud to be welded to said object, guided by said frame for movement in a direction lengthwise of the stud and at right angles to the length of said rod, and pivotally attached to the free end of the other arm of said lever for actuation thereby, and a flexible conductor electrically connecting said rod to said stud supporting means.

10. The device according to claim 9, wherein said stud supporting means includes a stud holding chuck, in which one end of the stud to be welded is removably confined, and a holder pivoted to the said other arm of said lever and to which the chuck is detachably coupled, whereby chucks for studs of different lengths and diameters may be held in welding positions by said holder.

11. The device according to claim 9, wherein a ferrule holder is carried by said frame in a position to dispose a ceramic ferrule to receive and guide endwise through it the free end of a stud carried by said stud holding chuck.

12. The device according to claim 9, wherein said stud supporting means includes a holder, and a chuck carried by said holder formed for detachably holding one end of a stud to be welded, with such stud extending endwise of itself from said chuck in the direction of movement of said holder for contact at its free end with said object to which it is to be welded.

13. The device according to claim 9, wherein said stud supporting means includes a holder, a chuck carried by said holder formed for detachably holding one end of a stud to be welded, with such stud extending endwise of itself from said chuck in the direction of movement of said holder for contact at its free end with said object to which it is to be welded, and a tubular ferrule holder carried on the free end of said frame in a position in which the free end of said stud to be welded extends through and is guided by any ceramic ferrule held in said ferrule holder.

References Cited in the file of this patent
UNITED STATES PATENTS 2,191,494    Nelson _____ Feb. 27, 1940

FOREIGN PATENTS 637,032    Great Britain _____ May 10, 1950